Patented Jan. 19, 1937

2,068,614

UNITED STATES PATENT OFFICE 2,068,614

GAS ODORANT MIXTURE

Charles A. Thomas, Wayne, and Wilhelm Schmidt-Nickels, Philadelphia, Pa., assignors to The Sharples Solvents Corporation, Philadelphia, Pa., a corporation of Delaware No Drawing. Application November 16, 1932, Serial No. 642,939

7 Claims. (Cl. 48—195)

The present invention relates to the art of gas distribution and involves the production of an odorizing material adapted to serve as a warning agent by means of which leaks or open gas cocks are brought to the immediate attention of the consumer in order that they may be properly corrected.

The use of alkyl mercaptans including simple aliphatic mercaptans and aryl substituted alkyl mercaptans, has heretofore been suggested in this connection, but objection has been taken to the commercial utilization of these compounds because of their corrosive effects upon metal apparatus and conduits of the gas distribution system. It is the object of the present invention to produce a mixture including a mercaptan as the principal odorizing compound together with other compounds which act to inhibit the corrosive effect of the mercaptan and facilitate its introduction into the distribution system in economical and carefully regulated proportions.

It has been learned that light exerts a strong catalytic effect upon the mercaptan in attacking the metal and a further feature of the invention has therefore been to devise a method of shielding the mixtures from the detrimental effect of certain of the light rays, which act to produce the undesired corrosion reaction in portions of the apparatus. Certain parts of such apparatus are covered with glass to make inspection possible and a suitable dye has been added to the odorizing mixture in order to shield the interior of the apparatus from the undesired catalytic effect of a part or all of the light rays passing through the glass covers. The use of such a dye accomplishes an important function in the prevention of corrosion in portions of the apparatus through which the odorizing mixture passes, in liquid phase, to the gas distribution system.

The mixture therefore comprises a mercaptan, a chemical compound serving as a corrosion inhibitor, a dye which acts as a light shield to inhibit the catalytic effect of light passing through the mixture and a diluent. Amyl mercaptan is preferred as the principal odorant because of its strong and disagreeable odor, this odor being retained even when a small amount of the mercaptan is diluted in an enormous volume of gas. The high boiling range of the isomeric amyl mercaptans prevents undue evaporation and renders it possible to introduce them into the gas distribution system in carefully regulated proportions.

As corrosion inhibitors, the class of alkyl nitrosoamines has been found to have a remarkable effect and diamyl nitrosoamine has been found to be particularly effective in this connection.

Undesired light is preferably shielded from the mixture while in the liquid phase by the introduction of a suitable dye and the red dye Sudan III has been found to shield the majority of the undesired light from the interior of the apparatus without rendering inspection impossible. Other dyes may, however, be used in this connection.

As an illustrative embodiment of our invention the following mixture may be used:

| | |
|---|---|
| Amyl mercaptan | lb.  ½ |
| Diamyl nitrosoamines | lb.  1/16 |
| Sudan III | gram  ¾ |
| Gasoline | gallon  1 |

The mercaptan odor of the mixture described above may be noted when diluted in the ratio of one gallon of mixture to one million cubic feet of gas, and when the constituents are mixed in the ratio of two gallons of mixture to one million cubic feet of gas the mixture is sufficiently strong to be immediately perceptible.

While a specific mixture and method have been described, we wish it to be understood that we do not intend to limit the interpretation of the invention except by the terms of the subjoined claims. Other mercaptans such as ethyl, propyl, butyl, hexyl and higher homologues may, for example, be substituted for the amyl mercaptan suggested and aryl substituted mercaptans such as benzyl mercaptan may likewise be used. Similarly other nitrosoamines may be substituted for the diamyl nitrosoamine suggested and other dyes may likewise be substituted for the Sudan III mentioned by way of illustration. Diethyl and dibutyl nitrosoamines have been found to have a satisfactory inhibiting effect. Indeed, insofar as the invention pertains to the feature of light exclusion, it includes embodiments whereby light is excluded by other means than the introduction of a dye into the mixture; e. g. by the provision of an external shield which excludes a portion of the rays tending to exert the undesired catalytic action while permitting the admission of sufficient light to permit the desired inspection.

We claim:

1. A gas odorizing mixture comprising essentially amyl mercaptan and diamyl nitrosoamine in proportions of one to four parts of diamyl nitrosoamine to ten parts of amyl mercaptan.

2. A gas odorizing mixture comprising essentially approximately one part of diamyl nitrosoamine to five parts of amyl mercaptan.

3. A gas odorizing mixture comprising essentially a mercaptan which tends to deteriorate and corrode metals and a small proportion of a stabilizer consisting of alkyl nitrosoamine having not over five carbon atoms in its alkyl radicals.

4. A gas odorizing mixture comprising essentially a mercaptan which tends to deteriorate and corrode metals and a small proportion of a stabilizer consisting of dialkyl nitrosoamine having not over five carbon atoms in its alkyl radicals.

5. A gas odorizing mixture comprising essentially a mercaptan which tends to deteriorate and corrode metals and a small proportion of a stabilizer consisting of diamyl nitrosoamine.

6. A gas odorizing mixture comprising essentially a mercaptan, which upon exposure to light tends to corrode metal, a dye that will prevent at least a substantial proportion of the light which causes the corrosion from penetrating the mixture and a small proportion of a stabilizing material consisting of alkyl nitrosoamine, the alkyl radicals of which contain not more than five carbon atoms.

7. A gas odorizing mixture comprising essentially a mercaptan, which upon exposure to light tends to corrode metal, a dye that will prevent at least a substantial proportion of the light which causes the corrosion from penetrating the mixture and a small proportion of a stabilizing material consisting of diamyl nitrosoamine.

CHARLES A. THOMAS.
WILHELM SCHMIDT-NICKELS.